United States Patent
Lyle et al.

(10) Patent No.: US 9,473,363 B2
(45) Date of Patent: Oct. 18, 2016

(54) MANAGING QUALITY OF SERVICE FOR COMMUNICATION SESSIONS (71) Applicant: GLOBALFOUNDRIES Inc., Grand Cayman (KY)

(72) Inventors: Ruthie D. Lyle, Durham, NC (US); Patrick J. O'Sullivan, Ballsbridge (IE); Fred Raguillat, Meath (IE); Carol Sue Zimmet, Boxborough, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 123 days.

(21) Appl. No.: 13/941,919

(22) Filed: Jul. 15, 2013

(65) Prior Publication Data

US 2015/0016283 A1   Jan. 15, 2015

(51) Int. Cl.
H04L 12/24 (2006.01)
H04L 29/08 (2006.01)
H04L 29/06 (2006.01)

(52) U.S. Cl.
CPC ....... *H04L 41/5025* (2013.01); *H04L 65/1083* (2013.01); *H04L 65/403* (2013.01); *H04L 65/80* (2013.01); *H04L 67/1029* (2013.01)

(58) Field of Classification Search
None
See application file for complete search history.

(56) References Cited

U.S. PATENT DOCUMENTS

| | | | |
|---|---|---|---|
| 5,742,772 A | 4/1998 | Sreenan | |
| 6,421,720 B2* | 7/2002 | Fitzgerald | 709/224 |
| 6,453,336 B1* | 9/2002 | Beyda et al. | 709/204 |
| 7,987,233 B1* | 7/2011 | Osborne | H04N 7/15 709/206 |
| 2003/0156218 A1* | 8/2003 | Laksono | 348/388.1 |
| 2004/0028199 A1* | 2/2004 | Carlson | H04M 3/564 379/93.21 |
| 2005/0015444 A1* | 1/2005 | Rambo | G06F 3/04842 709/204 |
| 2005/0256925 A1* | 11/2005 | Luo | H04L 12/1822 709/204 |
| 2006/0025149 A1* | 2/2006 | Karaoguz et al. | 455/452.2 |
| 2007/0024706 A1* | 2/2007 | Brannon et al. | 348/142 |
| 2008/0158337 A1* | 7/2008 | Richardson | 348/14.09 |
| 2009/0235329 A1* | 9/2009 | Chavez | H04L 63/105 726/3 |
| 2010/0194847 A1* | 8/2010 | Halavy | H04N 7/152 348/14.09 |
| 2010/0232518 A1* | 9/2010 | Coleman, Sr. | 375/240.26 |
| 2011/0119716 A1* | 5/2011 | Coleman, Sr. | 725/62 |
| 2012/0239747 A1 | 9/2012 | Kilmer et al. | |
| 2013/0169742 A1* | 7/2013 | Wu | H04N 7/152 348/14.08 |

FOREIGN PATENT DOCUMENTS

WO    2012057733 A1    5/2012

* cited by examiner

*Primary Examiner* — Bunjob Jaroenchonwanit
(74) *Attorney, Agent, or Firm* — Heslin Rothenberg Farley & Mesiti P.C.; George Blasiak (57) ABSTRACT

A computer-implemented method, computer program product, and computing system is provided for managing quality of service for communication sessions. In an implementation, a method may include monitoring a performance attribute of a computing system hosting a plurality of communication sessions. The method may also include determining that the performance attribute of the computing system exceeds a defined threshold. The method may further include adjusting a characteristic of a communication activity associated with at least one of the plurality of communication sessions to achieve a threshold quality of service associated with one or more of the communication sessions.

20 Claims, 3 Drawing Sheets

MANAGING QUALITY OF SERVICE FOR COMMUNICATION SESSIONS

TECHNICAL FIELD

The present disclosure generally relates to systems and method for electronic communications, and more particularly relates to managing quality of service for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include monitoring a performance attribute of a computing system hosting a plurality of communication sessions. The method may also include determining that the performance attribute of the computing system exceeds a defined threshold. The method may further include adjusting a characteristic of a communication activity associated with at least one of the plurality of communication sessions to achieve a threshold quality of service associated with one or more of the communication sessions.

One or more of the following features may be included. The performance attribute may include one or more server resources. At least a portion of the plurality of communication sessions may include electronic meetings. The communication activity may include one or more of audio, video, graphical, and text exchange. The at least one of the plurality of communication sessions may include one or more select communication sessions.

The method may further include providing a notification to one or more participants of the at least one of the plurality of communications sessions of the adjusted characteristic of the communication activity. The method may further include reevaluating the performance attribute. The method may also include readjusting the characteristic of communication activity associated with the at least one of the plurality of communication sessions.

According to another implementation, a computer program product may include a computer readable medium having a plurality of instructions stored on it. When executed by a processor, the instructions may cause the processor to perform operations including monitoring a performance attribute of a computing system hosting a plurality of communication sessions. Instructions may also be included for determining that the performance attribute of the computing system exceeds a defined threshold. Instructions may further be included for adjusting a characteristic of a communication activity associated with at least one of the plurality of communication sessions to achieve a threshold quality of service associated with one or more of the communication sessions.

One or more of the following features may be included. The performance attribute may include one or more server resources. At least a portion of the plurality of communication sessions may include electronic meetings. The communication activity may include one or more of audio, video, graphical, and text exchange. The at least one of the plurality of communication sessions may include one or more select communication sessions.

Instructions may further be included for providing a notification to one or more participants of the at least one of the plurality of communications sessions of the adjusted characteristic of the communication activity. Instructions may further be included for reevaluating the performance attribute. Instructions may also be included for readjusting the characteristic of communication activity associated with the at least one of the plurality of communication sessions.

According to yet another implementation, a computing system may include a processor and a memory module coupled with the processor. The processor may be configured for monitoring a performance attribute of a computing system hosting a plurality of communication sessions. The processor may also be configured for determining that the performance attribute of the computing system exceeds a defined threshold. The processor may further be configured for adjusting a characteristic of a communication activity associated with at least one of the plurality of communication sessions to achieve a threshold quality of service associated with one or more of the communication sessions.

One or more of the following features may be included. The performance attribute may include one or more server resources. The communication activity may include one or more of audio, video, graphical, and text exchange. The at least one of the plurality of communication sessions may include one or more select communication sessions.

The processor may be further configured for providing a notification to one or more participants of the at least one of the plurality of communications sessions of the adjusted characteristic of the communication activity. The processor may be further configured for reevaluating the performance attribute. The processor may also be configured for readjusting the characteristic of communication activity associated with the at least one of the plurality of communication sessions.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Electronic meetings can often provide a very convenient approach for sharing information among multiple individuals. Electronic meetings can further be useful when the individuals are geographically dispersed, such that is may not be feasible or cost effect to have the participants in the electronic meeting actual congregate for an in person meeting. In addition to providing an advantageous collaboration solution, electronic meetings, and other electronic communications, can provide desirable costs savings, for example by providing increased productivity through collaboration, without necessitating travel that would otherwise be required for collaboration by geographically dispersed individuals.

Electronic meetings may utilize any of a variety of diverse communication types, such as online meetings having multimedia capabilities, voice-over-IP communication, video-over-IP communications, instant messaging, as well as various other multi-media, voice, video, and text-based communications, as well as combinations of various communication types. The various communication types utilized during the course of an electronic meeting may be hosted by a single server, or data center, and/or by more than one server (e.g., in which each server may host a different communication type). Further, a server, or data center, hosting communications for a given electronic meeting (e.g., communication session), may similarly host communications for a multitude of different communication sessions, as well as executing various different operations that may be related to, or un-related to, communication sessions. In some situations, demands placed on a server may tax the resources of the server, for example by causing relatively high CPU and/or memory utilization, such that the server may not be able to provide a desired quality of service for one or more of the communication sessions hosted by the server. In an embodiment, method consistent with the present disclosure may identity when a performance attribute of a computing system (e.g., the server, data center, or the like), such as CPU or memory utilization exceeds a threshold, above which the computing system is unlikely to be capable of maintaining the desired quality of service for a communication session. According to an implementation, a method of the present disclosure may adjust a characteristic of one or more communication sessions hosted by the computing system in order to achieve a threshold quality of service associated with one or more of the communication sessions hosted by the computing system. For example, the quality of video (such as size, frame rate, or the like), audio, or the like, associated with one or more communication sessions hosted by the server may be adjusted such that, given the available resources of the server, a threshold quality of service may be achieved for at least one of the communication sessions.

Figure 1:
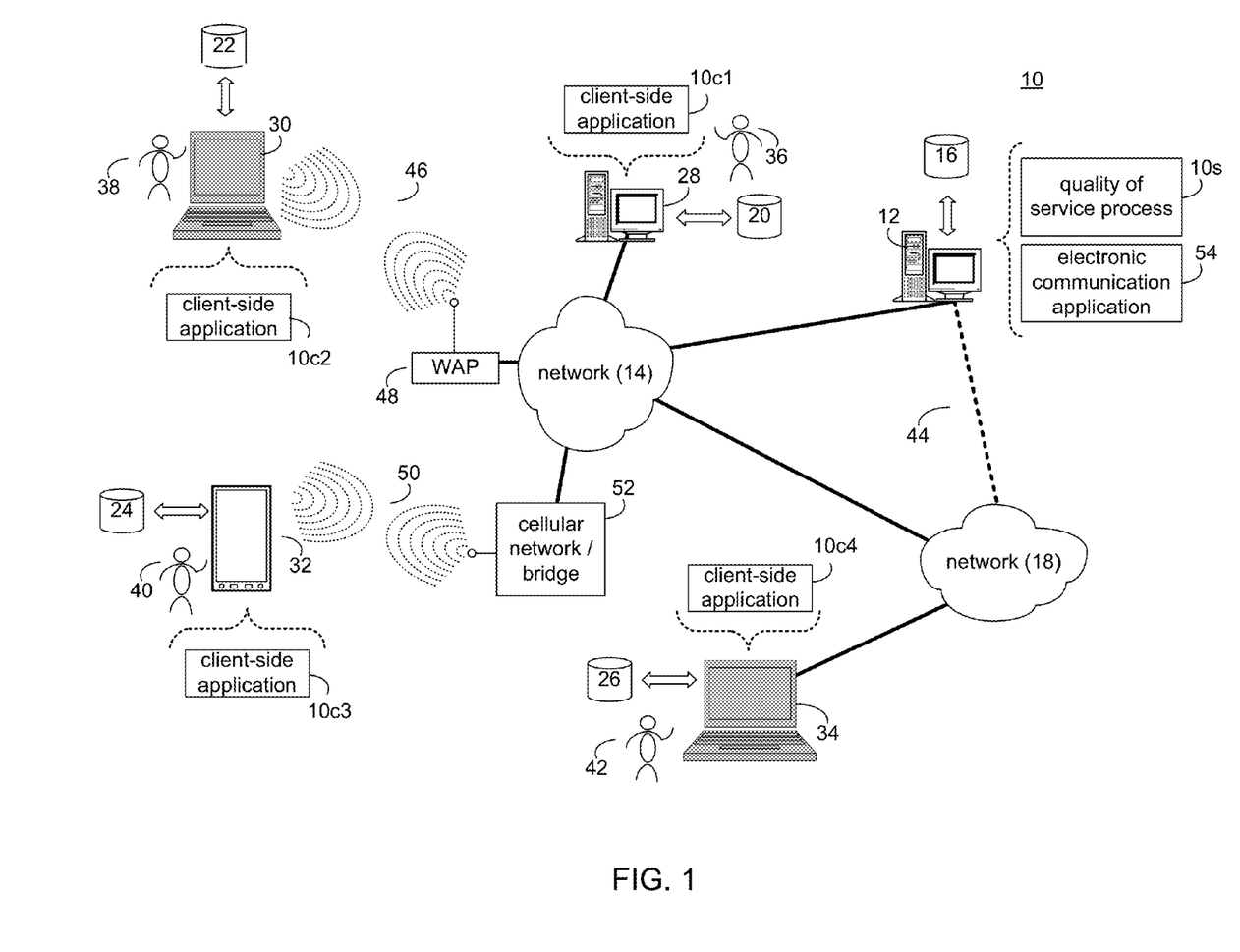
FIG. 1 is a diagrammatic view of a distributed computing network including a computing device that executes a quality of service process according to an implementation of the present disclosure.

Referring to FIG. 1, there is shown quality of service process 10. For the following discussion, it is intended to be understood that quality of service process 10 may be implemented in a variety of ways. For example, quality of service process 10 may be implemented as a server-side process, a client-side process, or a server-side/client-side process.

For example, quality of service process 10 may be implemented as a purely server-side process via quality of service process 10s. Alternatively, quality of service process 10 may be implemented as a purely client-side process via one or more of client-side application 10c1, client-side application 10c2, client-side application 10c3, and client-side application 10c4. Alternatively still, quality of service process 10 may be implemented as a server-side/client-side process via server-side quality of service process 10s in combination with one or more of client-side application 10c1, client-side application 10c2, client-side application 10c3, and client-side application 10c4. In such an example, at least a portion of the functionality of quality of service process 10 may be performed by quality of service process 10s and at least a portion of the functionality of quality of service process 10 may be performed by one or more of client-side application 10c1, 10c2, 10c3, and 10c3.

Accordingly, quality of service process 10 as used in this disclosure may include any combination of quality of service process 10s, client-side application 10c1, client-side application 10c2, client-side application 10c3, and client-side application 10c4.

Figure 2:
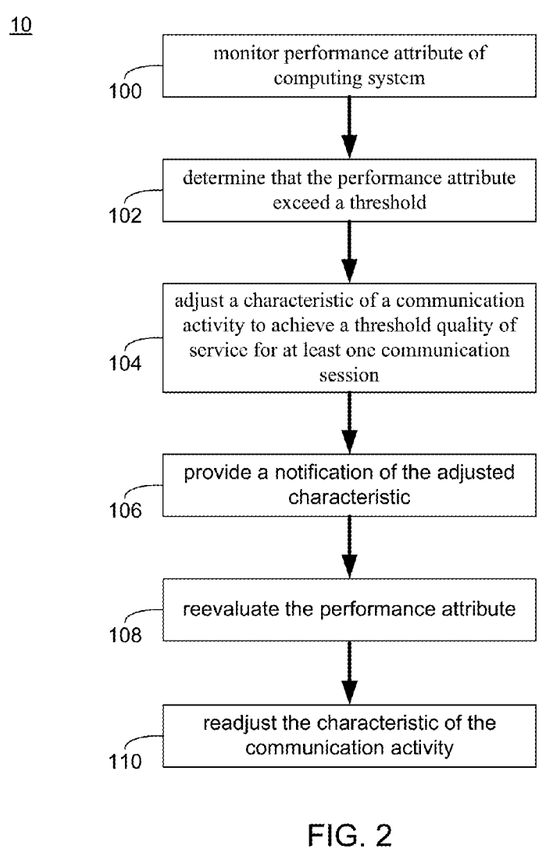
FIG. 2 is a flowchart of the quality of service process of FIG. 1, according to an implementation of the present disclosure.

Referring also to FIG. 2, and as will be discussed in greater detail below, quality of service process 10 may monitor 100 a performance attribute of a computing system hosting a plurality of communication sessions. Quality of service process 10 may also determine 102 that the performance attribute of the computing system exceeds a defined threshold. Quality of service process 10 may further adjust 104 a characteristic of a communication activity associated with at least one of the plurality of communication sessions to achieve a threshold quality of service associated with one or more of the communication sessions Quality of service process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of service process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of an electronic meeting application, a voice-over-IP application, a vide-over-IP application, an instant messaging application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of service process 10 directly through network 14 or through secondary network 18. Further, quality of service process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of service process 10 may communicate with, interact with, and/or include a component or module of a communication application, which may include, for example, an electronic meeting application, a web conferencing application, or similar application (e.g., electronic communication application 54). As is generally know, an electronic communication application (e.g., electronic communication application 54) may generally facilitate collaboration between individuals by way of communication sessions, for example by permitting audio, video, text, and/or other media exchanges between the participants and/or broadcast of audio, video, and/or other media from one or more participants (e.g., presenters) to one or more other participants. In some embodiments, a communication session may include an electronic meeting that may utilize one or more communication type. For example, electronic communication application 54 may allow one or more of voice communications, video communications, text-based messages, media exchanges (e.g., sharing and/or viewing of text documents, slide shows, audio and video media), and/or communication and/or consumption of electronic content amongst participants in an electronic communication session.

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in an electronic communication session (such as an electronic meeting, or other communication session type). The users may access electronic communication application 54 via one or more suitable applications, such as client side applications 10c1-10c4 (e.g., which may include a web browser, a client electronic meeting application, a voice-over-IP application, a video-over-IP application, and instant messaging application, or another application) and/or via a different application (not shown). As generally discussed above, a portion and/or all of the functionality of quality of service process 10 may be provided by one or more of client side applications 10c1-10c4. For example, in some embodiments quality of service process 10 (and/or client-side functionality of quality of service process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of service process 10 may monitor 100 a performance attribute of a computing system hosting a plurality of communication sessions. Quality of service process 10 may also determine 102 that the performance attribute of the computing system exceeds a defined threshold. Quality of service process 10 may further adjust 104 a characteristic of a communication activity associated with at least one of the plurality of communication sessions to achieve a threshold quality of service associated with one or more of the communication sessions.

For example, server computer 12 (e.g., via electronic communication application 54 and/or additional or alternative electronic communication applications) may host a plurality of communication sessions between different groups of respective participants. Examples of electronic communication sessions hosted server computer 12 may include, but are not limited to electronic meetings, voice communications, video communications, text-based communications, and the like. Further, one or more of the plurality of electronic communication sessions may utilize more than one communication type. For example, server computer 12 may host (e.g., via electronic communication application 54) a plurality of electronic meetings, each of which may have two or more participants. Further, the plurality of electronic meetings may utilized one or more communication types.

For example, an electronic meeting may include a visual component (e.g., by which a slide show presentation may be presented to the participants of the electronic meeting), an audio component (e.g., via which the participants may received broadcast audio and/or participate in multi-direction audio exchanges), a video component (e.g., via which a video presentation may be broadcast and/or broadcast or multi-direction video conferencing exchanges may occur), and a text component (e.g., via which textual information may be broadcast, text-based question-and-answers may be exchanges, and the like). It will be appreciated that server computer 12 (e.g., via electronic communication application 54) may facilitate electronic meetings including more, or fewer, communication types. Further, server computer 12 (e.g., via electronic communication application 54 and/or another communication application) may host communication sessions in addition/as an alternative to electronic meetings.

Additionally, it will be understood that server computer 12 (e.g., via electronic communication application 54) may host electronic communication sessions, which may include set-up and management of communications between multiple users. For example, electronic communication application 54 may allow users to join a communication session (e.g., by authenticating dial-in credentials) and the like. Further, communication application 54 may, in some embodiments, route communication traffic to participants in a communication session, manage broadcast of presentation materials (e.g., slide show presentations, etc.), and the like. An example of communication application 54 may include, but is not limited to, Lotus® Sametime®. (Lotus and Sametime are registered trademarks of International Business Machine Corporation in the United States, other countries, or both).

In some situations, the plurality of electronic communication sessions and/or other operations executed by server computer 12 (e.g., via electronic communication application 54 and/or one or more other applications) may result in a relatively high demand on system resources of server computer 12. In some situations, the relatively high demand on system resources may potentially compromise a quality of service associated with one or more of the communication sessions hosted by server computer 12. Quality of service process 10 may monitor 100 a performance attribute of a computing system hosting a plurality of communication sessions. In an embodiment, the performance attribute may include one or more server resources. For example, the performance attribute of the computing system may include, but is not limited to, degree of CPU utilization, degree of memory utilization, network performance (e.g., latency, packet loss, etc.). As generally discussed above, the performance attribute of the computing system (e.g., the degree of CPU utilization, degree memory utilization, etc.) may be based on utilization by the plurality of electronic communication sessions, based on utilization by other operations executed by server computer 12, and/or based on a combination of utilization by the plurality of electronic communication sessions and other operations executed by server computer 12.

Quality of service process 10 may also determine 102 that the performance attribute of the computing system exceeds a defined threshold. For example, as generally discussed above, server resources may be consumed by one or more processes executed by the server, including communication sessions hosted by the server and/or other operations executed by the server. Increasing demands may be placed on server computer 12 such that the utilization of server resources (e.g., CPU utilization, memory utilization, or the like) may exceed a threshold. In an embodiment, the defined threshold for the performance attribute may be associated with a projected, and/or an actual, quality of service level (and/or decrease) experienced by one or more of the communication sessions hosted by server computer 12 (e.g., via electronic communication application 54). For example, when a relatively high demand is placed on server computer 12 (e.g., which may be experienced as a relatively high CPU utilization, a relatively high memory utilization, or the like) the quality of service for one or more of the communication sessions may decreased, resulting a quality of service of a communication session being below a desired level.

In an embodiment, quality of service process 10 may determine 102 that the performance attribute of the computing system exceeds a defined threshold by ascertaining the performance attribute of the system (e.g., by ascertaining a CPU utilization, a memory utilization, or other system performance attribute), above which an undesired decrease in quality of service for at least one communication session may occur. For example, the defined threshold of the performance attribute may be a threshold above which a decrease in quality of service of at least one communication session may potentially occur. In some embodiments, quality of service process 10 may determine 102 that the performance attribute exceeds a defined threshold by determining an actual quality of service for at least one communication session that is below a desired quality of service for the communication session. In an example, a quality of service for communication session that is below a desired quality of service for the communication session may result in, e.g., a decrease in video quality, a decrease in audio quality, increased transition times (e.g., increased time between a moderator requesting a slide change and the slide change occurring for one or more participants, etc.). In some embodiments, a quality of service goal may be established for one or more individual communication sessions hosted by the server. In one such embodiment, quality of service process 10 may determine that the performance attribute of the computing system exceeds a defined threshold by ascertaining that one or more communication sessions are experiencing a quality of service that is below a respective quality of service goal for the one or more communication sessions.

Quality of service process 10 may further adjust 104 a characteristic of a communication activity associated with at least one of the plurality of communication sessions to achieve a threshold quality of service associated with one or more of the communication sessions. As generally described above, the plurality of communication sessions hosted by the server may utilize diverse communication types. Further, at least a portion of the plurality of communication sessions may utilize more than one communication type. For example, at least a portion of the communication session may include electronic meetings, e.g., which may utilize more than communication type. Further, each communication type may include one or more communication activity. For example, an electronic meeting may include an audio component (e.g., which may allow a presenter to broadcast an audio presentation component and/or allow for audio discussion amongst at least a portion of the meeting participants), a multi-media component (e.g., which may allow presentation slides or graphical components to be broadcast to the meeting participants), a video component (e.g., which may allow video conferencing and/or video presentation), and a text component (e.g., via instant messaging or other text exchange). Accordingly, a communication activity may include one or more of audio, video, graphical, and text exchange. Further, it will be appreciated that a single communication type may include more than one communication activity. For example, a video component, or communication type, may include both an audio communication activity and a video communication activity. According to various embodiments, a given communication activity may represent an individual component of a communication session, and/or may represent the entirety of the communication session.

In an embodiment, quality of service process 10 may have an awareness and/or understanding of the various communication activities associated with a communication session. Further, in an embodiment, quality of service process 10 may have an awareness and/or understanding that specific communication activities may contribute to a quality of service of a communication session. For example, a video communication activity may represent a relatively resource intensive communication activity. For example, the processing and routing of real-time, or near real-time, video data may have relatively high associated system resource requirements (e.g., as compared to other communication activities, such as text exchange communication activities). Further, quality of service process 10 may have an awareness and/or understanding that disruptions in video communication activity, such as high loss rates, high latency, or the like, may result in a relatively high user-perceived decrease in quality of service of the communication session. In an embodiment, quality of service process 10 may adjust 104 a characteristic of a communication activity to achieve a threshold quality of service (e.g., which may result in a user-perceived quality of service level) for at least one of the communication sessions. Quality of service process 10 may, for example, adjust 104 a characteristic of a communication activity including modifying specific functions of a communication activity in real-time, or near real-time, while the meeting is ongoing. Adjusting 104 a characteristic of a communication activity may include modifying individual units of work by the communication application at an application level. IN some embodiments, modifying individual units of work may be based on historical data relative to a quality of service impact of each unit work.

As discussed above, a communication activity may include, for example, audio exchange (e.g. transmission of audio from one or more participants of the communication session to one or more other participants of the communication session), video exchange (e.g., transmission of video from one or more participants of the communication session to one or more other participants of the communication session), graphical exchange (e.g., transmission of graphical data from one or more participants of the communication session to one or more other participants of the communication session), text exchange (e.g., transmission of text data from one or more participants of the communication session to one or more other participants of the communication session), or the like. Adjusting 104 a characteristic of a communication activity may include adjusting 104 one or more characteristics of audio exchange, video exchange, graphical exchange, text exchange, or the like, associated with at least one of the plurality of communication sessions hosted by the server. For example, adjusting 104 a characteristic of an audio communication activity may include adjusting 104 a quality (e.g., bit rate) of an audio transmission. Similarly, adjusting 104 a characteristic of a video communication activity may include adjusting a video quality (e.g., frame rate, size, resolution, etc.). Adjusting 104 a characteristic of a graphical communication activity may include, for example, adjusting 104 an image quality (e.g., size, resolution, color palette, etc.) of graphical features. Further, adjusting 104 a characteristic of a graphical communication activity and/or a text communication activity may include, for example, adjusting 104 a latency or responsiveness of the communication activity (e.g., how quickly slide changes take place, slide transition times, availability of text services such as web-chat, and the like). Quality of service process 10 may adjust 104 various additional/alternative characteristics of communication activities.

Adjusting 104 a characteristic of a communication activity associated with at least one of the plurality of communication sessions to achieve a threshold quality of service associated with one or more of the communication sessions may include adjusting 104 the characteristic of a communication activity of the at least one communication session to decrease a performance attribute (e.g., degree of CPU utilization, degree of memory utilization, or the like) of the computing system hosting the plurality of communication sessions. Decreasing the performance attribute of the computing system hosting the plurality of communication sessions may, for example, free up resources of the computing system, allowing a threshold quality of service to be achieved for one or more of the plurality of communication sessions, e.g., by virtue of the increased available resources of the computing system. For example, adjusting 104 a characteristic of a communication activity to decrease the degree of CPU and/or memory utilization of server computer 12 may make more CPU and/or memory resources available for achieving the threshold quality of service for the one or more of the plurality of communication sessions.

For example, server computer 12 may host (via electronic communication application 54) 1000 electronic meetings, each having between two and 50 participants. Quality of service process 10 may determine 102 that the plurality of electronic meetings are consuming a significant amount of system resources, such that a performance attribute (e.g., degree of CPU utilization and/or degree of memory utilization) of server computer 12 exceeds threshold, such that a potential decrease in quality of service for one or more of the electronic meetings may potentially result, and/or is actually being experience. Accordingly, quality of service process 10 may adjust 104 a characteristic of a communication activity of at least one of the electronic meetings. For example, quality of service process 10 may adjust 104 a characteristic of a communication activity including decreasing a video frame rate, video size, and/or video resolution of at least one of the electronic meetings. Decreasing the video frame rate, video size, and/or video resolution associated with at least one of the electronic meetings may result in more CPU capacity, more memory capacity, or the like, of server computer 12. The increase in available CPU capacity, memory capacity, or the like, may allow a threshold quality of service to be achieved for one or more of the electronic meetings. For example, sufficient system resources may be made available to allow video, audio, graphical, text, etc., communications associated with the one or more electronic meetings to be transmitted having a quality of service (e.g., in terms of lower loss rates, lower latency, etc.) at or above the threshold quality of service.

In an embodiment, quality of service process 10 may adjust 104 a characteristic of a communication activity of the at least one communication session including altering the characteristic of the communication activity at server computer 12 (e.g., via electronic communication application 54). In an embodiment, quality of service process 10 may adjust 104 a characteristic of a communication activity of the at least one communication session including transmitting instructions to one or more client-side applications associated with the at least one communication session to operate the communication session at the adjusted 104 characteristic. For example, quality of service process 10 may adjust 104 a characteristic of a communication activity for a communication session in which user 36 (via computing device 28) may be a participant. For example, quality of service process 10 may adjust 104 a video frame rate of the communication session in which user 36 is a participant from five frames per second to four frames per second. In an embodiment, quality of service process 10 may transmit an instruction to client-side application 10c1 to adjust 104 a frame rate for video transmitted by computing device 28 from five frames per second to four frames per second.

Consistent with the foregoing, in an embodiment, quality of service process 10 may adjust 104 characteristics of communication activities based on, at least in part, an awareness and/or understanding of a change in performance threshold, or a change in quality of service, that would result from a corresponding adjustment 104 in a characteristic of a communication activities. The awareness and/or understanding of the change in performance threshold and/or quality of service may be based on, at least in part, historical data (e.g., which may correlate changes in characteristics of communication activities with changes in performance threshold and/or quality of service), default settings, user preferences, or the like. In some embodiments, based on the awareness and/or understanding, quality of service process 10 may adjust 104 characteristics of communication activities including modifying specific functions of a communication session (e.g., video quality, presentation slide size or resolution, audio quality, availability of text services such as web-chat, or the like). Adjusting 104 characteristics of communication activities may achieve changes in performance thresholds of the computing system. The changes in performance thresholds of the computing system may allow threshold qualities of service to be achieved for one or more of the plurality of communication sessions (e.g., based on the system resources made available by adjusting 104 the characteristics of the at least one communication session).

In some embodiments, adjusting 104 characteristics of a communication activity may include giving preference to some communication activities over other communication activities. For example, quality of service process 10 may adjust video quality (frame rate, size, resolution, etc.) which maintaining audio quality (e.g., minimized latency, loss, or noise). Adjusting 104 communication activity characteristics may allow system performance thresholds to be lowered, while maintaining a relatively higher user-perceived (e.g., subjective) quality of service for communication sessions. The communication activity characteristics that may be given preference over other communication activity characteristics may be based upon, at least in part, historical data, defaults, user preferences, or the like.

As discussed above, quality of service process 10 may adjust 104 characteristics of a communication activity associated with at least one communication session. In an embodiment, quality of service process 10 may adjust 104 a characteristic of communication activities associated with all of the active communication sessions. In such an embodiment, each of the active communication sessions (and/or each of the active communication sessions utilizing a given communication activity, such as video, or audio, etc.) may experience the same adjustment 104 in the characteristic of the communication activity. Accordingly, the decrease in performance necessary to maintain the threshold quality of service for the one or more of the plurality of communication sessions may be equally shared by all of the active communication session.

For example, in an embodiment in which the plurality of communication sessions hosted by server computer 12 (e.g., via electronic communication application 54) include 1000 electronic meetings, each including between two and 50 participants, quality of service process 10 may adjust 104 a video quality for each of the 1000 electronic meetings from five frames per second to four frames per second. As such, while each electronic meeting may experience a decrease in video quality (e.g., in terms of frame rate), the resources made available by the adjustment 104 may allow a threshold quality of service (e.g., in terms of latency, loss, noise, etc.) to be maintained for one or more individual electronic meetings, and/or to be maintained for all of the active electronic meetings.

In an embodiment, quality of service process 10 may adjust 104 a characteristic of a communication activity associated with at least one of the plurality of communication sessions, in which the at least one of the plurality of communication sessions include one or more selected communication sessions. Consistent with such an embodiment, quality of service process 10 may target specific communication sessions, and may adjust 104 a characteristic of a communication activity associated with the targeted specific communication sessions. In an embodiment, the at least one of the plurality of communication session may include one or more selected communications sessions so as to exempt one or more communication sessions from experiencing an adjustment 104 of a characteristic of a communication activity.

Communication sessions may be targeted for adjustment 104, and/or exempted from adjustment 104 based upon, at least in part, a variety of criteria. In an example embodiment, a communication session may be targeted and/or exempted based on one or more participants of the communication session. For example, a communication session utilizing a relatively large amount of system resources may be targeted for adjustment 104 of a characteristic of a communication activity of the communication session. For example, a communication session including one (and/or a threshold number of) participants having a specified status (e.g., an executive status, a status as a customer, a specified degree of seniority, a specified position, such as manager, or the like) may be exempted from having a characteristic of a communication activity adjusted 104. In an embodiment, a communication session may be exempted from having a characteristic of a communication activity adjusted 104 based upon, at least in part, a session attribute, such as a number of participants in the communication session, or the like. Various additional/alternative criteria may be defined for targeting, and/or exempting, a communication session from adjustment. The criteria may be based upon, at least in part, default rules, user preferences, or the like.

In a generally similar manner as discussed above with respect to targeting and/or exempting a communication session from having a characteristic of a communication activity adjusted, the one or more communication sessions for which a threshold quality of service may be maintained may be selected based on a variety of criteria. For example, quality of service process 10 may adjust 104 a characteristic of a communication activity of at least one communication session to maintain a threshold quality of service for all of the plurality of communication sessions and/or for one or selected communication sessions. A threshold quality of service may be maintained for one or more selected communication sessions, for example, based upon one or more of a participant status, a session attribute, and/or another criterion as generally discussed above. Criteria for maintaining a threshold quality of service for a communication session may be based upon, at least in part, a default rule, a user preference, or the like.

Quality of service process 10 may provide 106 a notification to one or more participants of the at least one of the plurality of communications sessions of the adjusted 104 characteristic of the communication activity. For example, in such an embodiment upon (e.g., prior to, at the time or, and/or after) quality of service process 10 adjusts 104 a characteristic of a communication activity of the at least one communication session, quality of service process 10 may provide 106 a notification to one or more participants of the communication session. For example, quality of service process 10 may provide a notification of the adjustment 104 to a moderator of a communication session, to a most senior participant of the communication session, to all participants of the communication session, and/or to another participant and/or subset of participants of the communication session. Providing 106 the notification may include providing an audible and/or a visual notification of the adjustment. In an embodiment, the notification may include an identification of the adjusted 104 characteristic and/or the adjusted 104 communication activity.

Quality of service process 10 may reevaluate 108 the performance attribute. For example, quality of service process 10 may continuously and/or intermittently monitor 100 the performance attribute of the computing system to determine 102 that the performance attribute exceeds a threshold. Upon determining 102 that the performance attribute exceeds the threshold, quality of service process 10 may adjust 104 a characteristic of a communication activity.

Subsequent to adjusting 104 the characteristic of the communication activity, quality of service process 10 may continuously and/or intermittently reevaluate 108 the performance attribute, e.g., to determine if the performance attribute continues to exceed the threshold and/or to determine if the performance attribute resumes a level indicative of an increase in availability of system resources. For example, in addition/as an alternative to an increase in availability of system resources resulting from the adjustment 104 of the characteristic of the communication activity, demands on the computing system may dynamically vary, for example, as resource intensive processes end, etc. Quality of service process 10 may reevaluate 108 the performance attribute to determine, e.g., dynamic changes in system demands and resource utilization.

Quality of service process 10 may readjust 110 the characteristic of communication activity associated with the at least one of the plurality of communication sessions. For example, in response to reevaluating 108 the performance attributes of the computing system quality of service process 10 may determine that the performance attribute of the computing system may have decrease far enough below the threshold (e.g., based on decrease in demands on the computing system) to allow the characteristic of the communication activity associated with the at least one of the plurality of communication sessions to be returned to an original state and/or increased by some magnitude, e.g., without causing the performance attribute of the computing system to exceed the threshold. In such a situation, quality of service process 10 may readjust 110 the characteristic of the communication activity of the at least one of the plurality of communication sessions, e.g., to an original level, and/or to another level that may increase the quality of service of the at least one communication session without causing the performance attribute of the computing system to exceed the threshold.

In some embodiments, quality of service process 10 may reevaluate 108 the performance attribute of the computing system and may determine that the performance attribute may exceed the threshold. For example, additional demands may have been placed on the computing system, resulting in further utilization of the system resources. Additionally/alternatively, the adjustment 104 of the characteristic of the communication activity of the at least one of the plurality of communication sessions may not have reduced the demands on the computing system sufficiently to reduce the performance attribute below the threshold. In either situation, quality of service process 10 may readjust 110 a characteristic of a communication activity of at least one of the plurality of communication sessions. In an embodiment, readjusting a characteristic of at least one of the plurality of communication sessions may include one or more of readjusting 110 the previously adjusted 104 characteristic of the communication activity by a greater degree, readjusting 110 a different characteristic of the same and/or of a different communication activity, and/or readjusting 110 a characteristic of a communication activity of one or more other communication sessions of the plurality of communication sessions. In an embodiment, quality of service process 10 may readjust 110 a characteristic of a communication activity of at least one of the plurality of communication sessions to maintain a threshold quality of service associated with one or more of the plurality of communication sessions.

Figure 3:
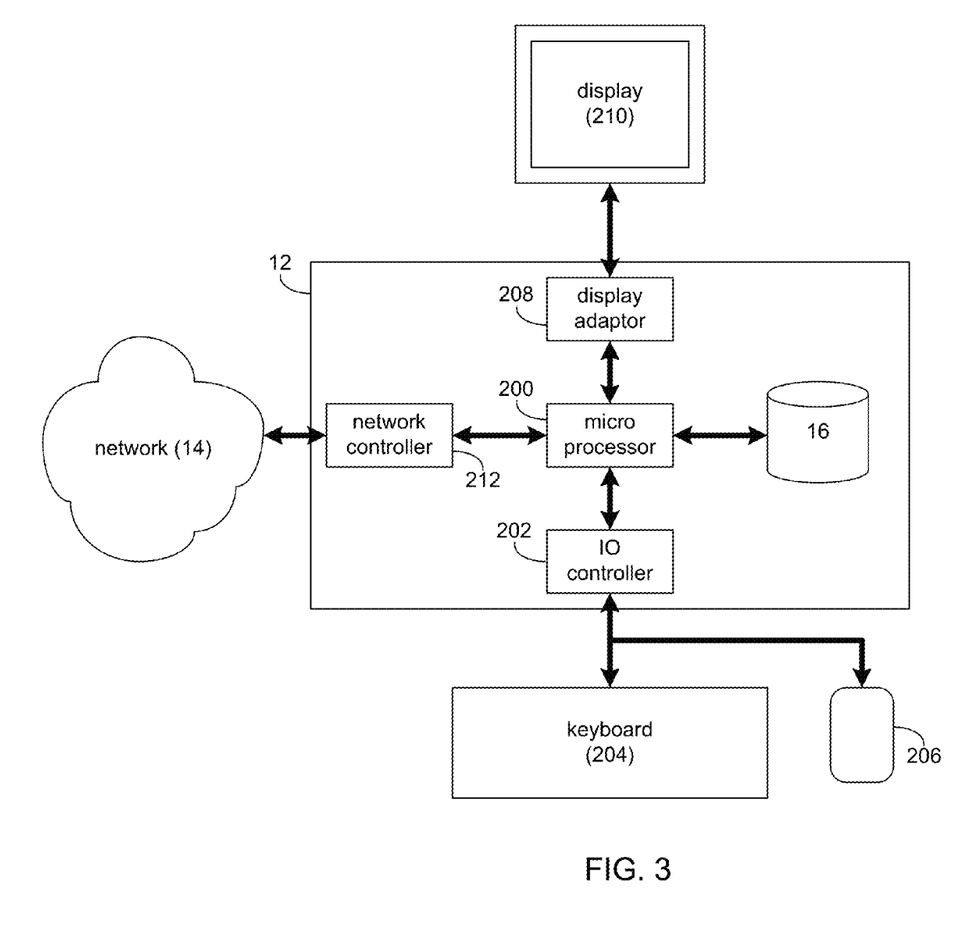
FIG. 3 is a diagrammatic view of the computing device of FIG. 1, according to an implementation of the present disclosure.

Referring also to FIG. 3, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of service process 10 may be substituted for computing device 12 within FIG. 3, examples of which may include but are not limited to client electronic devices 28, 30, 32, 34.

Computing system 12 may include microprocessor 200 configured to e.g., process data and execute instructions/code for screen capture process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, C#.NET, PHP, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 200) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

There is set forth herein (A) A computer-implemented method comprising: monitoring, by one or more processors, a performance attribute of a computing system hosting a plurality of communication sessions; determining, by the one or more processors, that the performance attribute of the computing system exceeds a defined threshold; and adjusting, by the one or more processors, a characteristic of a communication activity associated with at least one of the plurality of communication sessions to achieve a threshold quality of service associated with one or more of the communication sessions. There is set forth herein the computer-implemented method of (A), wherein the performance attribute includes one or more server resources. There is set forth herein the computer-implemented method of (A), wherein at least a portion of the plurality of communication sessions include electronic meetings. There is set forth herein the computer-implemented method of (A), wherein the communication activity includes one or more of audio, video, graphical, and text exchange. There is set forth herein the computer-implemented method of (A), wherein the at least one of the plurality of communication sessions includes one or more select communication sessions. There is set forth herein the computer-implemented method of (A), further including providing a notification to one or more participants of the at least one of the plurality of communications sessions of the adjusted characteristic of the communication activity. There is set forth herein the computer-implemented method of (A), further including reevaluating the performance attribute, and readjusting the characteristic of communication activity associated with the at least one of the plurality of communication sessions.

There is set forth herein (B) a computer program product comprising a computer readable medium having a plurality of instructions stored thereon, which, when executed by a processor, cause the processor to perform operations including: monitoring a performance attribute of a computing system hosting a plurality of communication sessions; determining that the performance attribute of the computing system exceeds a defined threshold; and adjusting a characteristic of a communication activity associated with at least one of the plurality of communication sessions to achieve a threshold quality of service associated with one or more of the communication sessions. There is set forth herein the computer program product of (B), wherein the performance attribute includes one or more server resources. There is set forth herein the computer program product of (B), wherein at least a portion of the plurality of communication sessions include electronic meetings. There is set forth herein the computer program product of (B), wherein the communication activity includes one or more of audio, video, graphical, and text exchange. There is set forth herein the computer program product of (B), wherein the at least one of the plurality of communication sessions includes one or more select communication sessions. There is set forth herein the computer program product of (B), further including instructions for providing a notification to one or more participants of the at least one of the plurality of communications sessions of the adjusted characteristic of the communication activity. There is set forth herein the computer program product of (B), further including instructions for reevaluating the performance attribute, and readjusting the characteristic of communication activity associated with the at least one of the plurality of communication sessions.

There is set forth herein (C) a computing system comprising: a processor and a memory module coupled with the processor, the processor configured for: monitoring a performance attribute of a computing system hosting a plurality of communication sessions; determining that the performance attribute of the computing system exceeds a defined threshold; and adjusting a characteristic of a communication activity associated with at least one of the plurality of communication sessions to achieve a threshold quality of service associated with one or more of the communication sessions. There is set forth herein (c) the computing system of (C), wherein the performance attribute includes one or more server resources. There is set forth herein the computing system of (C), wherein the communication activity includes one or more of audio, video, graphical, and text exchange. There is set forth herein the computing system of (C), wherein the at least one of the plurality of communication sessions includes one or more select communication sessions. There is set forth herein the computing system of (C), wherein the processor is further configured for providing a notification to one or more participants of the at least one of the plurality of communications sessions of the adjusted characteristic of the communication activity. There is set forth herein the computing system of (C), wherein the processor is further configured for reevaluating the performance attribute, and readjusting the characteristic of communication activity associated with the at least one of the plurality of communication sessions.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
monitoring, by one or more processors, a performance attribute of a computing system hosting a plurality of communication sessions;
determining, by the one or more processors, that the performance attribute of the computing system exceeds a defined threshold, wherein the one or more processors is configured to target at least one of the plurality of communication sessions to adjust a communication activity and to exempt at least one of the plurality of communication sessions from experiencing an adjustment of a communication activity; and
adjusting, by the one or more processors, a characteristic of a communication activity associated with the at least one of the plurality of communication sessions that is targeted to achieve a threshold quality of service associated with one or more of the communication sessions, including exempting the at least one of the plurality of communication sessions that is exempted from experiencing an adjustment, wherein the exempting is based on, at least in part, at least one session attribute, wherein the at least one session attribute includes a number of participants of the at least one of the plurality of communication sessions.

2. The computer-implemented method of claim 1, wherein the performance attribute includes one or more server resources.

3. The computer-implemented method of claim 1, wherein at least a portion of the plurality of communication sessions include electronic meetings.

4. The computer-implemented method of claim 1, wherein the communication activity includes one or more of audio, video, graphical, and text exchange.

5. The computer-implemented method of claim 1, wherein the at least one of the plurality of communication sessions includes one or more select communication sessions.

6. The computer-implemented method of claim 1, further including providing a notification to one or more participants of the at least one of the plurality of communications sessions of the adjusted characteristic of the communication activity.

7. The computer-implemented method of claim 1, further including reevaluating the performance attribute, and readjusting the characteristic of communication activity associated with the at least one of the plurality of communication sessions.

8. A computer program product comprising a non-transitory computer readable medium having a plurality of instructions stored thereon, which, when executed by a processor, configure the processor to perform operations including:
monitoring a performance attribute of a computing system hosting a plurality of communication sessions;
determining that the performance attribute of the computing system exceeds a defined threshold;
targeting at least one of the plurality of communication sessions to adjust a communication activity and performing exempting to exempt at least one of the plurality of communication sessions from experiencing an adjustment of a communication activity; and
adjusting a characteristic of a communication activity associated with the at least one of the plurality of communication sessions that is targeted to achieve a threshold quality of service associated with one or more of the communication sessions, including exempting the at least one of the plurality of communication sessions that is exempted from experiencing an adjustment, wherein the exempting is based on, at least in part, at least one session attribute, wherein the at least one session attribute includes a number of participants of the at least one of the plurality of communication sessions.

9. The computer program product of claim 8, wherein the performance attribute includes one or more server resources.

10. The computer program product of claim 8, wherein at least a portion of the plurality of communication sessions include electronic meetings.

11. The computer program product of claim 8, wherein the communication activity includes one or more of audio, video, graphical, and text exchange.

12. The computer program product of claim 8, wherein the at least one of the plurality of communication sessions includes one or more select communication sessions.

13. The computer program product of claim 8, further including instructions for providing a notification to one or more participants of the at least one of the plurality of communications sessions of the adjusted characteristic of the communication activity.

14. The computer program product of claim 8, further including instructions for reevaluating the performance attribute, and readjusting the characteristic of communication activity associated with the at least one of the plurality of communication sessions.

15. A computing system comprising:
a processor and a memory module coupled with the processor, the processor configured for:
monitoring a performance attribute of a computing system hosting a plurality of communication sessions;
determining that the performance attribute of the computing system exceeds a defined threshold;
targeting at least one of the plurality of communication sessions for adjustment of a communication activity and performing exempting to exempt at least one of the plurality of communication sessions from experiencing an adjustment of a communication activity; and
adjusting a characteristic of a communication activity associated with the at least one of the plurality of communication sessions that is targeted to achieve a threshold quality of service associated with one or more of the communication sessions, including exempting the at least one of the plurality of communication sessions that is exempted from experiencing an adjustment, wherein the exempting is based on, at least in part, at least one session attribute, wherein the at least one session attribute includes a number of participants of the at least one of the plurality of communication sessions.

16. The computing system of claim 15, wherein the performance attribute includes one or more server resources.

17. The computing system of claim 15, wherein the communication activity includes one or more of audio, video, graphical, and text exchange.

18. The computing system of claim 15, wherein the at least one of the plurality of communication sessions includes one or more select communication sessions.

19. The computer-implemented method of claim 1, wherein the exempting at least one of the plurality of communication sessions from experiencing an adjustment is based on, at least in part, a status of a participant.

20. The computer-implemented method of claim 1, wherein the exempting at least one of the plurality of communication sessions from experiencing an adjustment is based on, at least in part, a status of a participant, wherein the status is selected from the group consisting of an executive status, a customer status, a manager status, and a degree of seniority status.

* * * * *